United States Patent
Shih et al.

(10) Patent No.: US 11,888,549 B2
(45) Date of Patent: Jan. 30, 2024

(54) ANTENNA SYSTEM

(71) Applicant: Wistron NeWeb Corp., Hsinchu (TW)

(72) Inventors: Ting-Han Shih, Hsinchu (TW); Ching-Wen Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 129 days.

(21) Appl. No.: 17/573,209

(22) Filed: Jan. 11, 2022

(65) Prior Publication Data

US 2022/0360298 A1 Nov. 10, 2022

(30) Foreign Application Priority Data

May 7, 2021 (TW) .................................. 110116552

(51) Int. Cl.
*H04B 5/00* (2006.01)
*H01Q 1/24* (2006.01)

(52) U.S. Cl.
CPC ........... *H04B 5/0081* (2013.01); *H01Q 1/243* (2013.01); *H04B 5/0031* (2013.01)

(58) Field of Classification Search
CPC .......... H01Q 1/24; H04B 5/00; H04B 5/0081; H04B 5/0031
See application file for complete search history.

(56) References Cited

U.S. PATENT DOCUMENTS

| | | | | |
|---|---|---|---|---|
| 9,166,291 | B2* | 10/2015 | Kato | H01Q 1/40 |
| 9,553,960 | B1* | 1/2017 | Liusvaara | H04M 1/035 |
| 2011/0102272 | A1* | 5/2011 | Wong | H01Q 1/243 |
| | | | | 343/702 |
| 2015/0269471 | A1* | 9/2015 | Finn | B23K 26/0622 |
| | | | | 29/601 |
| 2015/0269474 | A1* | 9/2015 | Finn | B23K 26/40 |
| | | | | 216/13 |
| 2015/0278675 | A1* | 10/2015 | Finn | G06K 19/07783 |
| | | | | 29/601 |
| 2015/0318602 | A1* | 11/2015 | Nakano | H01Q 9/045 |
| | | | | 343/702 |
| 2016/0257173 | A1* | 9/2016 | Young | H04B 5/0031 |
| 2021/0087044 | A1* | 3/2021 | Yazdi | G06K 7/1413 |
| 2022/0386216 | A1* | 12/2022 | Shen | H04W 40/12 |

FOREIGN PATENT DOCUMENTS

CN 103594776 A 2/2014

* cited by examiner

*Primary Examiner* — Thien M Le
(74) *Attorney, Agent, or Firm* — McClure, Qualey & Rodack, LLP

(57) ABSTRACT

A mobile device includes an NFC (Near Field Communication) antenna including a metal coil and a first dielectric substrate, a coupling metal element, and a second dielectric substrate. The metal coil is disposed on the first dielectric substrate. The coupling metal element is adjacent to the metal coil. The coupling metal element does not directly touch the metal coil. The coupling metal element is disposed on the second dielectric substrate. The coupling metal element is configured to adjust the operational frequency of the NFC antenna.

20 Claims, 9 Drawing Sheets

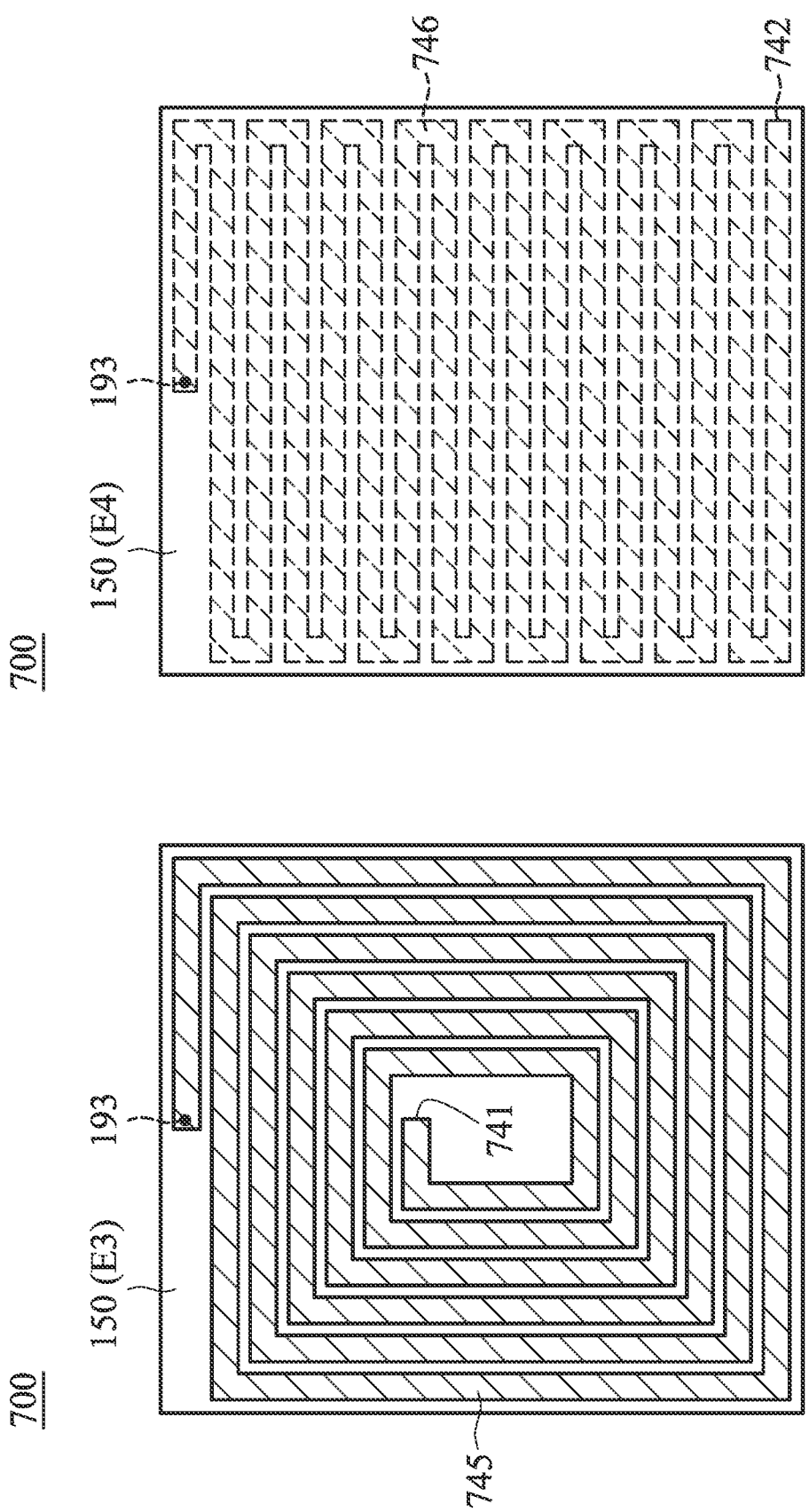

ANTENNA SYSTEM

CROSS REFERENCE TO RELATED APPLICATIONS

This application claims priority of Taiwan Patent Application No. 110116552 filed on May 7, 2021, the entirety of which is incorporated by reference herein.

BACKGROUND OF THE INVENTION

Field of the Invention

The disclosure generally relates to an antenna system, and more particularly, it relates to an antenna system with a tunable operational frequency.

Description of the Related Art

NFC (Near Field Communication) is also called "short-distance wireless communication", which is a high-frequency and wireless communication technology used in a short-distance range. NFC allows electronic devices to perform non-contact point-to-point data transmission to each other within a 10 cm (3.9 inch) range. However, because of different usage environments, the operational frequency of the NFC antenna may be shifted, thereby degrading the overall communication quality. Accordingly, there is a need to propose a novel solution for solving the problems of the prior art.

BRIEF SUMMARY OF THE INVENTION

In an exemplary embodiment, the disclosure is directed to an antenna system that includes an NFC (Near Field Communication) antenna including a metal coil and a first dielectric substrate, a coupling metal element, and a second dielectric substrate. The metal coil is disposed on the first dielectric substrate. The coupling metal element is adjacent to the metal coil. The coupling metal element does not directly touch the metal coil. The coupling metal element is disposed on the second dielectric substrate. The coupling metal element is configured to adjust the operational frequency of the NFC antenna.

BRIEF DESCRIPTION OF DRAWINGS

The invention can be more fully understood by reading the subsequent detailed description and examples with references made to the accompanying drawings, wherein:

FIG. 7A is a top view of an antenna system according to an embodiment of the invention;

FIG. 7B is a see-through view of an antenna system according to an embodiment of the invention.

DETAILED DESCRIPTION OF THE INVENTION

Figure 1A:
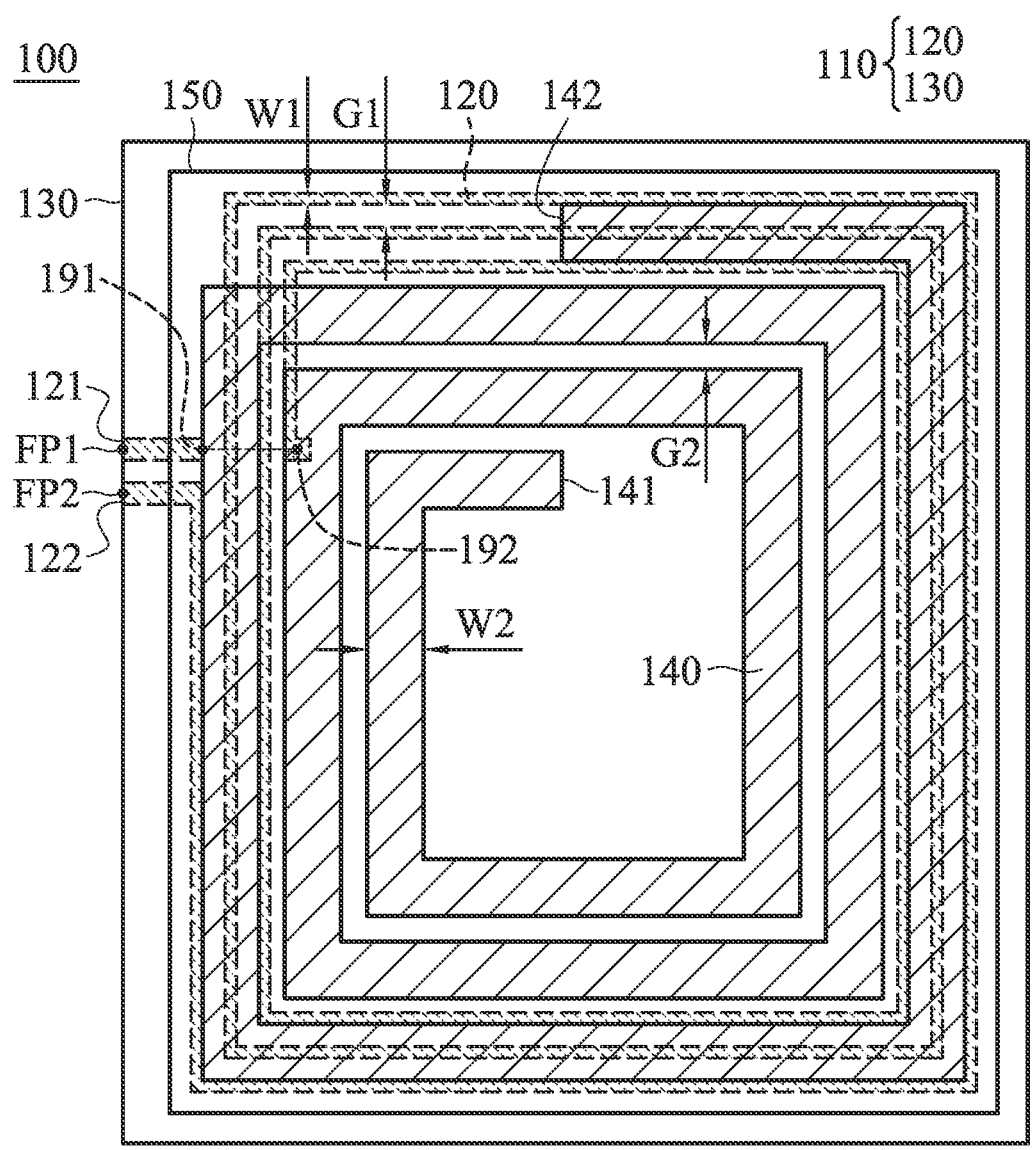
FIG. 1A is a top view of an antenna system according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
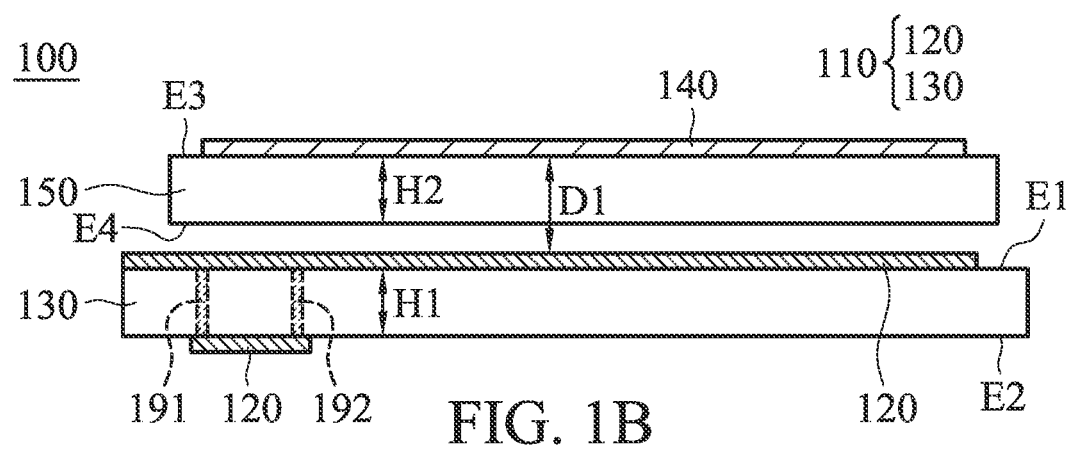
FIG. 1B is a side view of an antenna system according to an embodiment of the invention.

FIG. 1A is a top view of an antenna system 100 according to an embodiment of the invention. FIG. 1B is a side view of the antenna system 100 according to an embodiment of the invention. Please refer to FIG. 1A and FIG. 1B together. The antenna system 100 may be applied to a mobile device, such as a smartphone, a tablet computer, or a notebook computer. As shown in FIG. 1A and FIG. 1B, the antenna system 100 at least includes an NFC (Near Field Communication) antenna 110 including a metal coil 120 and a first dielectric substrate 130, a coupling metal element 140, and a second dielectric substrate 150. It should be understood that the antenna system 100 may further include other components, such as a system ground plane, an RF (Radio Frequency) module, and a housing, although they are not displayed in FIG. 1A and FIG. 1B.

The metal coil 120 is disposed on the first dielectric substrate 130. The shape and the turn number of the metal coil 120 are not limited in the invention. Specifically, the metal coil 120 has a first end 121 and a second end 122. A first feeding point FP1 is positioned at the first end 121 of the metal coil 120. A second feeding point FP2 is positioned at the second end 122 of the metal coil 120. The first feeding point FP1 and the second feeding point FP2 may be further coupled through a matching circuit to a positive electrode and a negative electrode of a signal source (not shown), respectively, such that the NFC antenna 110 is excited by the signal source.

The first dielectric substrate 130 may be an FR4 (Flame Retardant 4) substrate, a PCB (Printed Circuit Board), or an FPC (Flexible Printed Circuit Board). The first dielectric substrate 130 has a first surface E1 and a second surface E2 which are opposite to each other. In some embodiments, the antenna system 100 further includes one or more first conductive via elements 191 and 192 which penetrate the first dielectric substrate 130. The metal coil 120 is distributed over both the first surface E1 and the second surface E2 of the first dielectric substrate 130 by using the first conductive via elements 191 and 192 (a dashed line between the first conductive via elements 191 and 192 means that the first conductive via elements 191 and 192 are coupled to each other). However, the invention is not limited thereto. In alternative embodiments, the metal coil 120 is only distributed over either the first surface E1 or the second surface E2 of the first dielectric substrate 130.

The coupling metal element 140 is disposed on the second dielectric substrate 150. For example, the coupling metal element 140 may substantially have a spiral shape. The shape and the turn number of the coupling metal element 140 are not limited in the invention. Specifically, the coupling metal element 140 has a first end 141 and a second end 142, which are two open ends. In other words, the coupling metal element 140 is floating. The coupling metal element 140 is adjacent to the metal coil 120. The coupling metal element 140 does not directly touch the metal coil 120. It should be noted that the term "adjacent" or "close" over the disclosure means that the distance (spacing) between two corresponding elements is shorter than a predetermined distance (e.g., 5 mm or shorter), but often does not mean that the two corresponding elements are touching each other directly (i.e., the aforementioned distance/spacing therebetween is reduced to 0). In some embodiments, the coupling metal element 140 has a vertical projection on the NFC antenna 110, and the vertical projection may at least partially overlap the metal coil 120.

The second dielectric substrate 150 may be an FR4 substrate, a PCB, or an FPC, which may be independent of the first dielectric substrate 130. The second dielectric substrate 150 has a third surface E3 and a fourth surface E4 which are opposite to each other. The coupling metal element 140 may be only distributed over the third surface E3 of the second dielectric substrate 150. However, the invention is not limited thereto. In alternative embodiments, the coupling metal element 140 may be only distributed over the fourth surface E4 of the second dielectric substrate 150.

Figure 2:
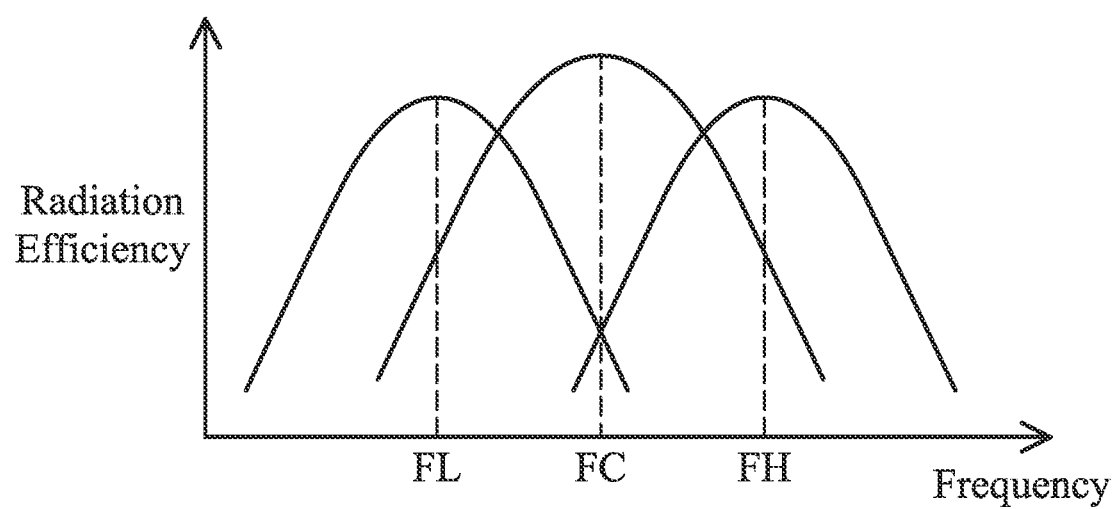
FIG. 2 is a diagram of operational characteristics of an antenna system according to an embodiment of the invention.

FIG. 2 is a diagram of operational characteristics of the antenna system 100 according to an embodiment of the invention. The horizontal axis represents frequency, and the vertical axis represents radiation efficiency. In an ideal case, the operational frequency of the NFC antenna 110 is at a central frequency FC. However, in response to different usage environments, the operational frequency of the NFC antenna 110 may fall down to a low shifting frequency FL, or may rise up to a high shifting frequency FH. At this time, the coupling metal element 140 can resonate with the metal coil 120, so as to readjust the operational frequency of the NFC antenna 110. For example, if the width W2 of the coupling metal element 140 decreases (it may be smaller than or equal to the width W1 of metal coil 120), the operational frequency of the NFC antenna 110 may become lower from the high shifting frequency FH back to the central frequency FC. Conversely, if the width W2 of the coupling metal element 140 increases (it may be greater than or equal to the width W1 of metal coil 120), the operational frequency of the NFC antenna 110 may become higher from the low shifting frequency FL back to the central frequency FC. According to the measurement of FIG. 2, the operational frequency of the NFC antenna 110 can be optimized by appropriately changing the width W2 of the coupling metal element 140. In alternative embodiments, the aforementioned operational frequency is further adjusted by appropriately changing the turn number and/or the internal gap G2 of the coupling metal element 140.

In some embodiments, the element sizes of the antenna system 100 are described as follows. The length of the metal coil 120 (i.e., the length from the first end 121 through the first conductive via elements 191 and 192 to the second end 122) may be shorter than or equal to 0.25 wavelength ($\lambda/4$) of the operational frequency of the NFC antenna 110. The width W1 (or line width) of the metal coil 120 may be from about 0.2 mm to about 2 mm. The width of the internal gap G1 of the metal coil 120 (i.e., the distance between any two adjacent parallel lines of the metal coil 120) may be from about 0.2 mm to about 2 mm. The thickness H1 of the first dielectric substrate 130 (i.e., the distance between the first surface E1 and the second surface E2) may be from 0.1 mm to 0.8 mm. The length of the coupling metal element 140 (i.e., the length from the first end 141 to the second end 142) may be shorter than or equal to 0.5 wavelength ($\lambda/2$) of the operational frequency of the NFC antenna 110. The width W2 (or line width) of the coupling metal element 140 may be from about 0.1 mm to about 4 mm. The width of the internal gap G2 of the coupling metal element 140 (i.e., the distance between any two adjacent parallel lines of the coupling metal element 140) may be from about 0.1 mm to about 4 mm. The thickness H2 of the second dielectric substrate 150 (i.e., the distance between the third surface E3 and the fourth surface E4) may be from 0.1 mm to 0.8 mm. The distance D1 between the metal coil 120 and the coupling metal element 140 (i.e., the shortest distance between them) may be from about 0.01 mm to about 1.6 mm. The above ranges of element sizes are calculated and obtained according to many experimental results, and they help to optimize the operational bandwidth and the impedance matching of the antenna system 100.

Figure 3A:
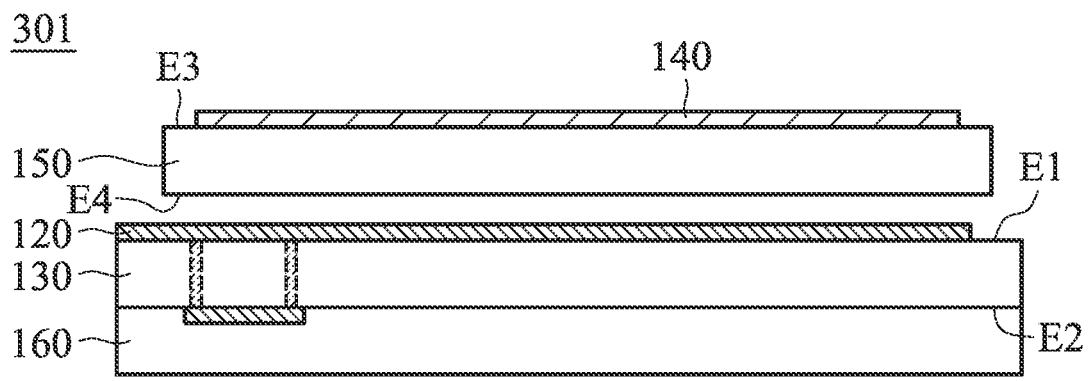
FIG. 3A is a side view of an antenna system according to an embodiment of the invention.

FIG. 3A is a side view of an antenna system 301 according to an embodiment of the invention. FIG. 3A is similar to FIG. 1B. In the embodiment of FIG. 3A, the antenna system 301 further includes a ferrite sheet 160, which is adjacent to the first dielectric substrate 130. For example, the ferrite sheet 160 may be directly attached to the second surface E2 of the first dielectric substrate 130, but it is not limited thereto. The ferrite sheet 160 can suppress EMI (Electromagnetic Interference) from other metal or circuit components. Other features of the antenna system 301 of FIG. 3A are similar to those of the antenna system 100 of FIG. 1A and FIG. 1B. Accordingly, the two embodiments can achieve similar levels of performance.

Figure 3B:
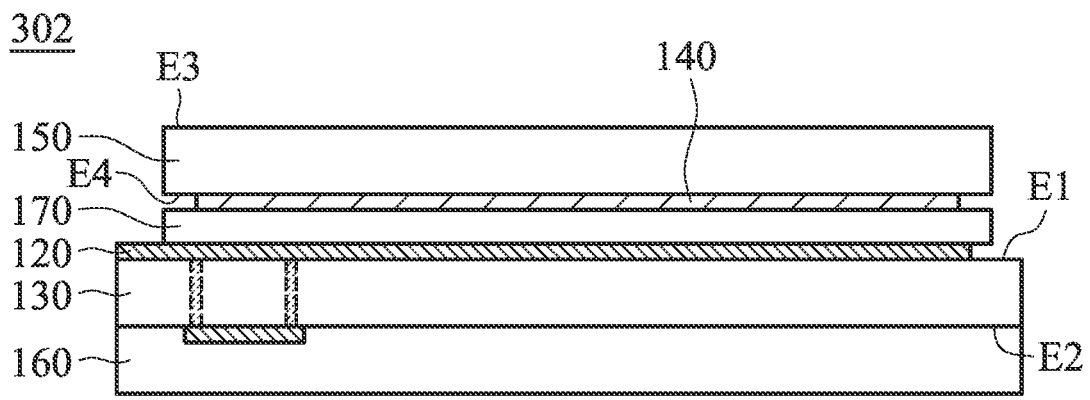
FIG. 3B is a side view of an antenna system according to an embodiment of the invention.

FIG. 3B is a side view of an antenna system 302 according to an embodiment of the invention. FIG. 3B is similar to FIG. 3A. In the embodiment of FIG. 3B, the coupling metal element 140 is only distributed over the fourth surface E4 of the second dielectric substrate 150. It should be noted that the fourth surface E4 of the second dielectric substrate 150 faces the first surface E1 of the first dielectric substrate 130. In order to prevent the coupling metal element 140 from directly touching the metal coil 120, the antenna system 302 further includes an isolation layer 170, which is configured to completely separate the metal coil 120 from the coupling metal element 140. For example, the isolation layer 170 can be implemented with a solder mask ink layer having a very small thickness (e.g., smaller than or equal to 0.1 mm), but it is not limited thereto. Other features of the antenna system 302 of FIG. 3B are similar to those of the antenna system 301 of FIG. 3A and FIG. 3B. Accordingly, the two embodiments can achieve similar levels of performance.

Figure 3C:
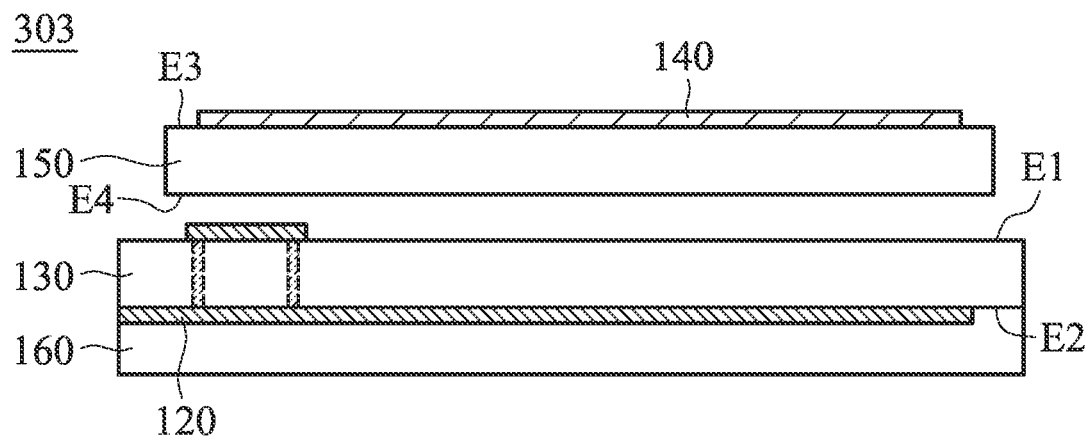
FIG. 3C is a side view of an antenna system according to an embodiment of the invention.

FIG. 3C is a side view of an antenna system 303 according to an embodiment of the invention. FIG. 3C is similar to FIG. 3A. In the embodiment of FIG. 3C, the metal coil 120 is mainly distributed over the second surface E2 of the first dielectric substrate 130. In comparison, the metal coil 120 of FIG. 3A is mainly distributed over the first surface E1 of the first dielectric substrate 130. Other features of the antenna system 303 of FIG. 3C are similar to those of the antenna system 301 of FIG. 3A. Accordingly, the two embodiments can achieve similar levels of performance.

Figure 3D:
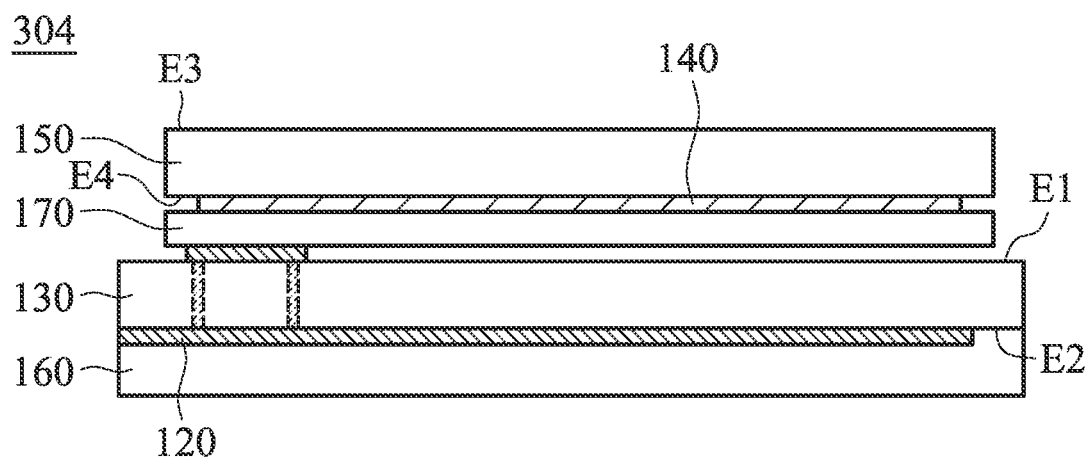
FIG. 3D is a side view of an antenna system according to an embodiment of the invention.

FIG. 3D is a side view of an antenna system 304 according to an embodiment of the invention. FIG. 3D is similar to FIG. 3C. In the embodiment of FIG. 3D, the coupling metal element 140 is only distributed over the fourth surface E4 of the second dielectric substrate 150, and the antenna system 304 further includes an isolation layer 170, which is configured to completely separate the metal coil 120 from the coupling metal element 140. Other features of the antenna system 304 of FIG. 3D are similar to those of the antenna system 303 of FIG. 3C. Accordingly, the two embodiments can achieve similar levels of performance.

Figure 4A:
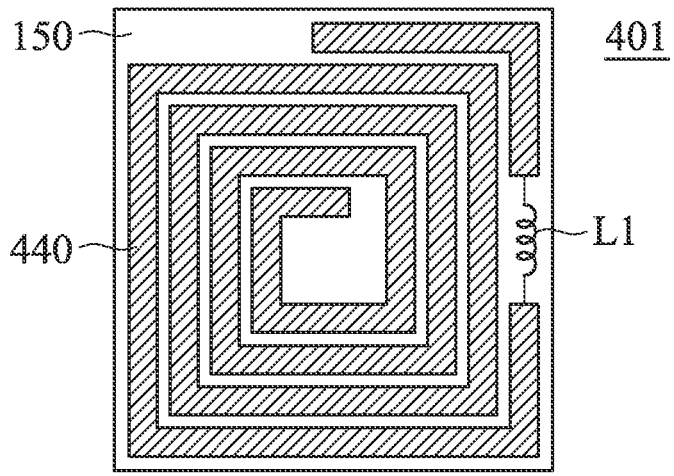
FIG. 4A is a top view of an antenna system according to an embodiment of the invention.
Figure 4B:
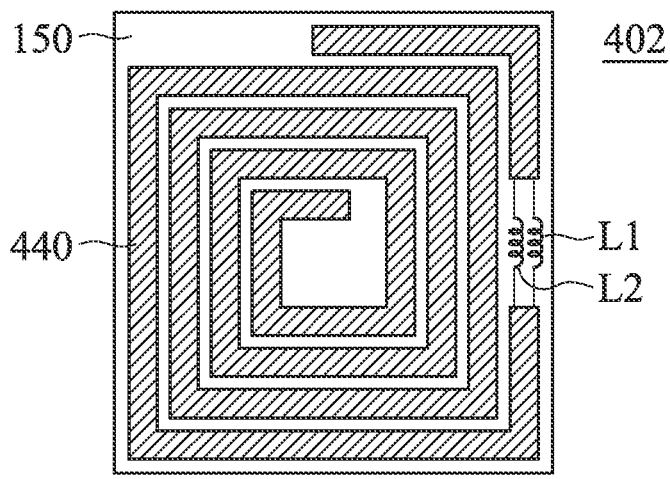
FIG. 4B is a top view of an antenna system according to an embodiment of the invention.
Figure 4C:
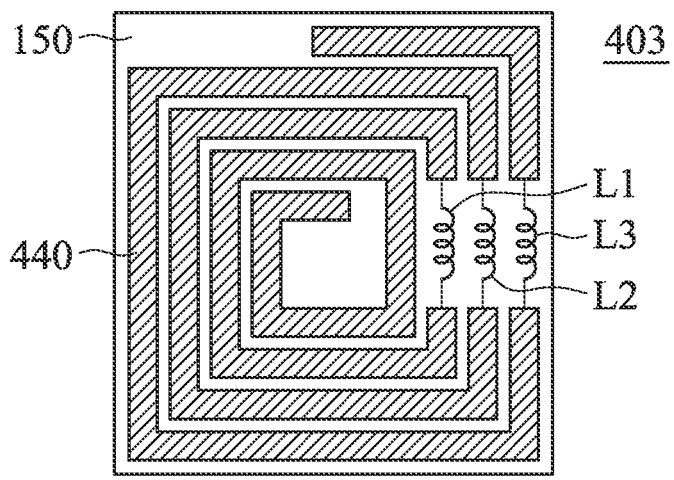
FIG. 4C is a top view of an antenna system according to an embodiment of the invention.

FIG. 4A is a top view of an antenna system 401 according to an embodiment of the invention. FIG. 4B is a top view of an antenna system 402 according to an embodiment of the invention. FIG. 4C is a top view of an antenna system 403 according to an embodiment of the invention. In order to simplify the figures, the corresponding NFC antennas are omitted. In the embodiment of FIG. 4A, FIG. 4B and FIG. 4C, each of the antenna systems 401, 402 and 403 includes one or more inductors L1, L2 and L3 coupled in series with a coupling metal element 440. The number and arrangements of the inductors L1, L2 and L3 are freely adjustable. According to practical measurements, since the inductive characteristic of the coupling metal element 440 is enhanced, the operational frequency of the corresponding NFC antenna is significantly increased. Other features of the antenna systems 401, 402 and 403 of FIG. 4A, FIG. 4B and FIG. 4C are similar to those of the antenna system 100 of FIG. 1A and FIG. 1B. Accordingly, these embodiments can achieve similar levels of performance.

Figure 5A:
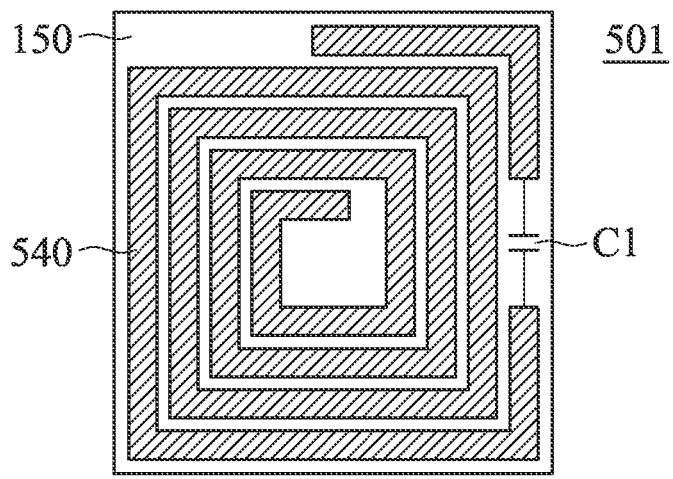
FIG. 5A is a top view of an antenna system according to an embodiment of the invention.
Figure 5B:
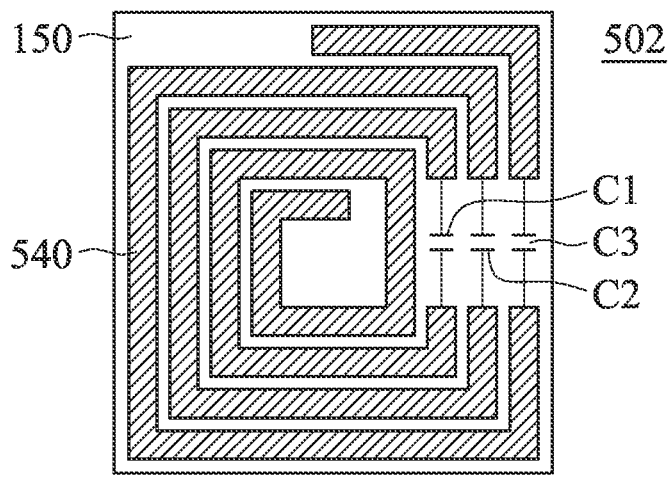
FIG. 5B is a top view of an antenna system according to an embodiment of the invention.
Figure 5C:
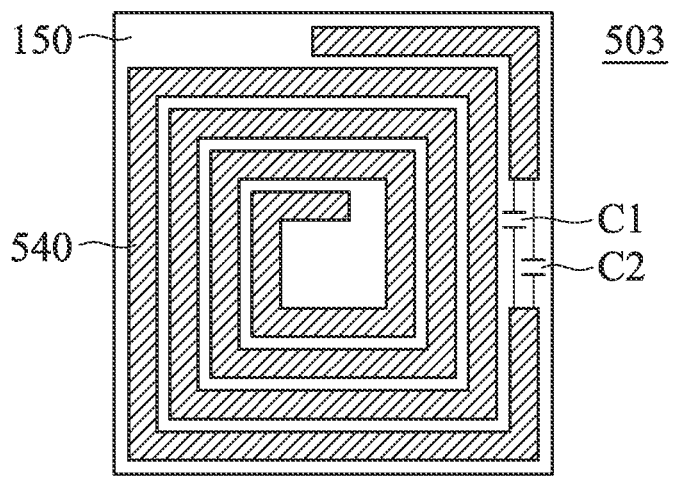
FIG. 5C is a top view of an antenna system according to an embodiment of the invention.

FIG. 5A is a top view of an antenna system 501 according to an embodiment of the invention. FIG. 5B is a top view of an antenna system 502 according to an embodiment of the invention. FIG. 5C is a top view of an antenna system 503 according to an embodiment of the invention. In order to simplify the figures, the corresponding NFC antennas are omitted. In the embodiment of FIG. 5A, FIG. 5B and FIG. 5C, each of the antenna systems 501, 502 and 503 includes one or more capacitors C1, C2 and C3 coupled in series with a coupling metal element 540. The number and arrangements of the capacitors C1, C2 and C3 are freely adjustable. According to practical measurements, since the inductive characteristic of the coupling metal element 540 is weakened, the operational frequency of the corresponding NFC antenna is significantly decreased. Other features of the antenna systems 501, 502 and 503 of FIG. 5A, FIG. 5B and FIG. 5C are similar to those of the antenna system 100 of FIG. 1A and FIG. 1B. Accordingly, these embodiments can achieve similar levels of performance.

Figure 6:
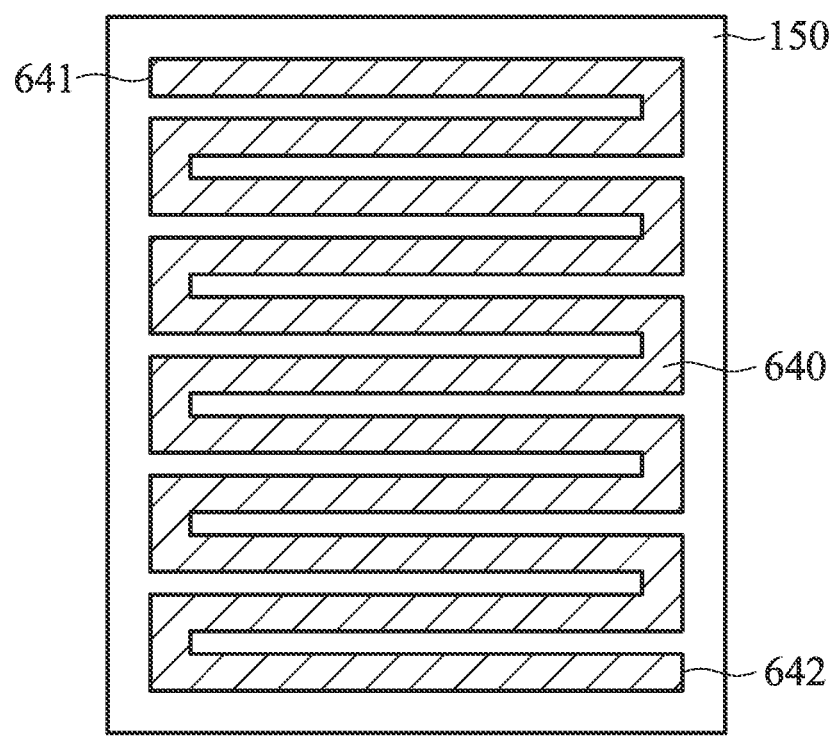
FIG. 6 is a top view of an antenna system according to an embodiment of the invention.

FIG. 6 is a top view of an antenna system 600 according to an embodiment of the invention. In order to simplify the figure, the corresponding NFC antenna is omitted. In the embodiment of FIG. 6, a coupling metal element 640 of the antenna system 600 substantially has a meandering shape, which includes a plurality of U-shapes connected with each other. Specifically, the coupling metal element 640 has a first end 641 and a second end 642, which are two open ends. According to practical measurements, even if the coupling metal element 640 has a different shape (e.g., non-spiral shape), it can still fine-tune the operational frequency of the corresponding NFC antenna. Other features of the antenna system 600 of FIG. 6 are similar to those of the antenna system 100 of FIG. 1A and FIG. 1B. Accordingly, the two embodiments can achieve similar levels of performance.

Figure 7C:
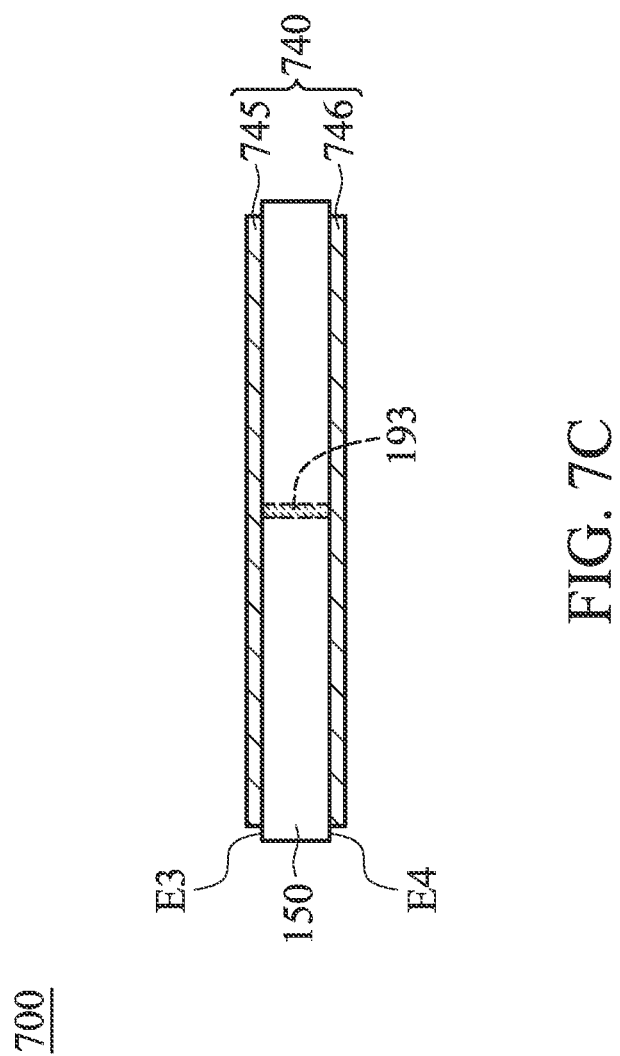
FIG. 7C is a side view of an antenna system according to an embodiment of the invention.

FIG. 7A is a top view of an antenna system 700 according to an embodiment of the invention. FIG. 7B is a see-through view of the antenna system 700 according to an embodiment of the invention. FIG. 7C is a side view of the antenna system 700 according to an embodiment of the invention. Please refer to FIGS. 7A, 7B and 7C together. In order to simplify the figure, the corresponding NFC antenna is omitted. In the embodiment of FIG. 7A, FIG. 7B and FIG. 7C, a coupling metal element 740 of the antenna system 700 includes a first portion 745 and a second portion 746. The first portion 745 is disposed on the third surface E3 of the second dielectric substrate 150. The second portion 746 is disposed on the fourth surface E4 of the second dielectric substrate 150. Specifically, the coupling metal element 740 has a first end 741 and a second end 742. The first end 741 of the coupling metal element 740 is adjacent to the first portion 745. The second end 742 of the coupling metal element 740 is adjacent to the second portion 746. For example, the first portion 745 of the coupling metal element 740 may substantially have a spiral shape, and the second portion 746 of the coupling metal element 740 may substantially have a meandering shape, but they are not limited thereto. In other embodiments, each of the first portion 745 and the second portion 746 of the coupling metal element 740 may substantially have a spiral shape or a meandering shape. It should be noted that the antenna system 700 further includes a second conductive via element 193, which penetrates the second dielectric substrate 150 and is coupled between the first portion 745 and the second portion 746 of the coupling metal element 740. The coupling metal element 740 is distributed over both the third surface E3 and the fourth surface E4 of the second dielectric substrate 150 by using the second conductive via element 193. According to practical measurements, such a double-sided coupling metal element 740 can further fine-tune the operational frequency of the corresponding NFC antenna. Other features of the antenna system 700 of FIG. 7A, FIG. 7B and FIG. 7C are similar to those of the antenna system 100 of FIG. 1A and FIG. 1B. Accordingly, the two embodiments can achieve similar levels of performance.

The invention proposes a novel antenna structure. In comparison to the conventional technology, the invention has at least the advantages of small size, low manufacturing cost, and tunable operation frequency, and therefore it is suitable for application in a variety of communication devices over different environments.

Note that the above element sizes, element shapes, and frequency ranges are not limitations of the invention. An antenna designer can fine-tune these settings or values according to different requirements. It should be understood that the antenna system of the invention is not limited to the configurations of FIGS. 1-7. The invention may merely include any one or more features of any one or more embodiments of FIGS. 1-7. In other words, not all of the features displayed in the figures should be implemented in the antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:
   an NFC (Near Field Communication) antenna, comprising a metal coil and a first dielectric substrate, wherein the metal coil is disposed on the first dielectric substrate;
   a coupling metal element, disposed adjacent to the metal coil, wherein the coupling metal element does not directly touch the metal coil; and
   a second dielectric substrate, wherein the coupling metal element is disposed on the second dielectric substrate;
   wherein the coupling metal element is configured to adjust an operational frequency of the NFC antenna.

2. The antenna system as claimed in claim 1, wherein the coupling metal element is floating.

3. The antenna system as claimed in claim 1, wherein the coupling metal element has a vertical projection on the NFC antenna, and the vertical projection at least partially overlaps the metal coil.

4. The antenna system as claimed in claim 1, wherein if a width of the coupling metal element decreases, the operational frequency of the NFC antenna becomes lower.

5. The antenna system as claimed in claim 1, wherein if a width of the coupling metal element increases, the operational frequency of the NFC antenna becomes higher.

6. The antenna system as claimed in claim 1, wherein the coupling metal element substantially has a spiral shape.

7. The antenna system as claimed in claim 1, wherein the coupling metal element substantially has a meandering shape.

8. The antenna system as claimed in claim 1, wherein a length of the metal coil is shorter than or equal to 0.25 wavelength of the operational frequency of the NFC antenna.

9. The antenna system as claimed in claim 1, wherein a length of the coupling metal element is shorter than or equal to 0.5 wavelength of the operational frequency of the NFC antenna.

10. The antenna system as claimed in claim 1, wherein a width of the metal coil is from 0.2 mm to 2 mm.

11. The antenna system as claimed in claim 1, wherein a width of the coupling metal element is from 0.1 mm to 4 mm.

12. The antenna system as claimed in claim 1, wherein a distance between the metal coil and the coupling metal element is from 0.01 mm to 1.6 mm.

13. The antenna system as claimed in claim 1, further comprising:
    a ferrite sheet, disposed adjacent to the first dielectric substrate.

14. The antenna system as claimed in claim 1, further comprising:
    an isolation layer, configured to separate the metal coil from the coupling metal element.

15. The antenna system as claimed in claim 1, further comprising:
    one or more inductors, coupled in series with the coupling metal element.

16. The antenna system as claimed in claim 1, further comprising:
    one or more capacitors, coupled in series with the coupling metal element.

17. The antenna system as claimed in claim 1, wherein the first dielectric substrate has a first surface and a second surface opposite to each other, and a thickness of the first dielectric substrate is from 0.1 mm to 0.8 mm.

18. The antenna system as claimed in claim 17, further comprising:
    one or more first conductive via elements, penetrating the first dielectric substrate, wherein the metal coil is distributed over the first surface and the second surface of the first dielectric substrate by using the first conductive via elements.

19. The antenna system as claimed in claim 1, wherein the second dielectric substrate has a third surface and a fourth surface opposite to each other, and a thickness of the second dielectric substrate is from 0.1 mm to 0.8 mm.

20. The antenna system as claimed in claim 19, further comprising:
    a second conductive via element, penetrating the second dielectric substrate, wherein the coupling metal element is distributed over the third surface and the fourth surface of the second dielectric substrate by using the second conductive via element.

\* \* \* \* \*